United States Patent [19]

Ponkala

[11] Patent Number: 5,156,045
[45] Date of Patent: Oct. 20, 1992

[54] METHOD RELATED TO IMPEDANCE DETECTORS IN RADIOSONDES

[75] Inventor: Jorma Ponkala, Ylönkylä, Finland
[73] Assignee: Vaisala Oy, Finland
[21] Appl. No.: 658,171
[22] Filed: Feb. 20, 1991

[30] Foreign Application Priority Data

Feb. 21, 1990 [FI] Finland .................. 900873

[51] Int. Cl.⁵ .................. G01W 1/08; G01W 1/02
[52] U.S. Cl. .................. 73/170 R; 374/179
[58] Field of Search .................. 374/29, 30, 109, 179; 73/170 R, 336; 324/685, 687; 340/870.17

[56] References Cited

U.S. PATENT DOCUMENTS

| | | | |
|---|---|---|---|
| 3,649,877 | 3/1972 | Friedman et al. | 73/170 R |
| 3,841,154 | 10/1974 | Mallery et al. | 73/170 R |
| 4,112,753 | 9/1978 | Call | 73/170 R |
| 4,481,514 | 11/1984 | Beukers et al. | 73/170 R X |

Primary Examiner—Michael Razavi
Assistant Examiner—Elizabeth L. Shopbell
Attorney, Agent, or Firm—Jones, Askew & Lunsford

[57] ABSTRACT

Method in improving of the precision of impedance detectors in radiosondes. In the method, the temperature of the detector or detectors (30 and/or 10) is measured by means of a thermocouple (20), in which the joint (23) of one branch of its thermoelements (21,22) is placed in connection with, or at the proximity of, the detector to be measured. In the thermocouple (20) the joint (24) of the other branch is placed in the atmosphere (SA) surrounding the detector. By means of the thermocouple (20), the difference $(T_1 - T_0)$ between the temperature $(T_1)$ prevailing in connection with the detector and the temperature $(T_0)$ in the surrounding atmosphere (SA) is detected. The output signal $(f_{out})$ of the measurement coupling of the radiosonde is affected by means of an electric signal (U(t)) representing the difference $(T_1-T_0)$ in temperature, which output signal contains the data concerning the meteorological quantity or quantities measured by means of the detector (30) or detectors (10,30). The DC voltage $(U_o)$ obtained from the thermocouple (20) is converted by means of an inverter (60) or equivalent into an AC voltage (U(t)), by means of which the output signal $(f_{out})$ of the measurement coupling is affected.

11 Claims, 4 Drawing Sheets

METHOD RELATED TO IMPEDANCE DETECTORS IN RADIOSONDES

The invention concerns a method in improving of the precision of impedance detectors in radiosondes.

In prior art, a number of different electrically expressed temperature and humidity detectors are known whose impedance varies as a function of the quantity to be measured. Such humidity detectors are known, e.g., from the U.S. Pat. Nos. 3,168,829 and 3,350,941 as well as from the applicant's Finnish Pat. No. 48,229.

As is known in prior art, for measurement of temperature, capacitive detectors are used, which are, as a rule, based thereon that the dielectric constant of the insulation material between the capacitor plates is dependent on the temperature, in which case the capacitance also depends on the temperature. For example, the applicant employs very small ceramic capacitors in accordance with said principle for temperature detectors in radiosondes. The accuracy of such a detector is usually sufficient, because it is not heated by the measurement current and because its Q-value is good. The detector is mechanically stable, and in it no significant ageing has been noticed, and its dynamism is sufficiently wide. Such a ceramic temperature detector must, however, be protected well from moisture, e.g., by means of glass. Thereby the size of the detector is multiplied, whereby the speed of the detector becomes lower and the errors of radiation are increased.

Said temperature detectors can be made to operate more accurately if the difference between their temperature and the surrounding temperature is known more precisely. The present invention provides a solution in particular for this problem.

For its part, the FI Patent No. 48,229 is included in the prior art related to the present invention, in which patent a capacitive humidity detector is described, wherein the dielectric material is a polymer film whose dielectric constant is a function of the water amount absorbed by the polymer film.

In the detectors described above, and so also in other detectors based on change in impedance, undesirable phenomena occur, which are, for example, radiation error, slowness of detectors, and hysteresis.

In the applicant's FI Patent Application No. 58,402, a method is suggested for reduction of undesirable properties caused by reversible alterations in an electric humidity detector based on change in impedance, in particular in a capacitive humidity detector in which the material sensitive to humidity is an organic polymer and in which humidity detector the material sensitive to humidity is heated, at least with higher relative humidities, to a temperature higher than the temperature in the environment of the humidity detector. If necessary, the heating capacity of the detector can be regulated as a function of the humidity that is measured.

In said FI Patent 58,402, the temperature of the humidity detector and/or the outside temperature is/are measured, and this or these measurement quantities are utilized in the calculation of the humidity measurement values.

In respect of the prior art related to the present invention, reference is also made to the applicant's FI Patent No. 57,319, in which a method is suggested for measurement of low capacitances so that the effect of stray capacitance is eliminated, in which method an RC oscillator circuit is used, whose output frequency depends, preferably inversely proportionally, on the capacitance to be measured. In the method of the latter FI patent, the capacitance to be measured is connected between a low-impedance generator and a circuit that measures the current only, for example between the input and the output of an inverting amplifier.

A general object of the present invention is further development of the prior-art technology of measurement of temperature and/or humidity, in particular in radiosonde applications.

An object of the present invention is further development of capacitive temperature detectors so that their radiation error and their slowness can be substantially eliminated.

An object of the invention is to provide a novel method of measurement and detector arrangement, in particular for radiosonde operation, in which the capacitive humidity detector is subjected to such a high moisture that the detector operation is deteriorated and water or ice is collected on the surface of the detector. When such a situation is over, it takes a long time before the water or ice has evaporated, during which time the detector, of course, gives an incorrect message, indicating an excessively high humidity. Under conditions that gather water, a detector may give an incorrect reading, for example, in a situation with supersaturated water vapour. By means of the heating of a capacitive humidity detector suggested in said FI Patent 58,402, the above drawbacks can be avoided, but, however, there remains the problem, which has not been solved in prior art, that, in order that a sufficiently accurate measurement of humidity could be achieved, the temperature of the detector must be known very precisely. In order that a measurement accuracy of 1 ... 2% of relative humidity could be achieved, it must be possible to measure the temperature at a precision of about 0.1° C. In the measurement of temperature, there may be a higher absolute error, but the difference in temperature in relation to the environment must be known at said precision.

An object of the invention is to provide a measurement method and a detector arrangement wherein the relative humidity can be measured at the precision of 1 ... 2% mentioned above. A further object of the invention is to provide a measurement method and a detector arrangement which are particularly well suitable for use in radiosondes, because, by means of the method, the detector arrangement can be made simple and of low-weight construction.

An object of the invention is to provide a humidity detector by whose means it is possible to avoid condensation of water on the surface of the humidity detector, for example, when a radiosonde flies in a cloud.

In view of achieving the objectives stated above and those that will come out later, the method of the invention is mainly characterized in that, in the method, the temperature of the detector or detectors is measured by means of a thermocouple, in which the joint of one branch of its thermoelements is placed in connection with, or at the proximity of, the detector to be measured and in which thermocouple the joint of the other branch is placed in the atmosphere surrounding the detector, and that, by means of said thermocouple, the difference between the temperature prevailing in connection with the detector and the temperature in the surrounding atmosphere is detected, the output signal of the measurement coupling of the radiosonde being affected by means of an electric signal representing said difference in temperature, which output signal contains the data concerning the meteorological quantity or quantities measured by means of the detector or detectors.

In the invention, a number of advantages are achieved at the same time. These advantages will be discussed in more detail in the following. By means of one calibration, two temperature detectors are obtained for operation. The other branch of the thermoelement is at some other known temperature than the detector of absolute temperature proper. When a thin thermoelement wire is used, high speed and low radiation error are achieved.

If the inverter idea applied in the invention is modified instead of voltages it is also possible to measure electric currents, resistances, or other electric quantities. The accuracy of measurement achieved owing to the invention is of an order of ±0.1° C., because the dynamism is good (it is easy to measure the frequency accurately) and because the thermocouple has no base signal, i.e. the voltage of the thermocouple is zero when it is not affected by a difference in temperature.

The coupling is optimal when the difference in temperature between the branches of the thermocouple is not so large that the change in frequency produced by the thermocouple does not substantially exceed the corresponding frequencies of the reference capacitors.

Within the scope of the invention, it is possible to accomplish measurement of humidity so that the humidity detector and the temperature detector and one branch of the thermoelement are in good thermal contact with one another and that this unit is heated only little. The other branch of the thermoelement is in the open air. In such a case, condensation of water on the surface of the humidity detector is avoided, e.g., in a sonde when it flies in a cloud. Owing to the heating, the detector does, of course, not display a relative humidity of 100%, but, since the difference in temperature is known, by means of calculation it is possible to determine the correct result of humidity measurement.

In the following, the invention will be described in detail with reference to some exemplifying embodiments of the invention illustrated in the figures in the accompanying drawing, the invention being not strictly confined to the details of said embodiments.

Figure 1:
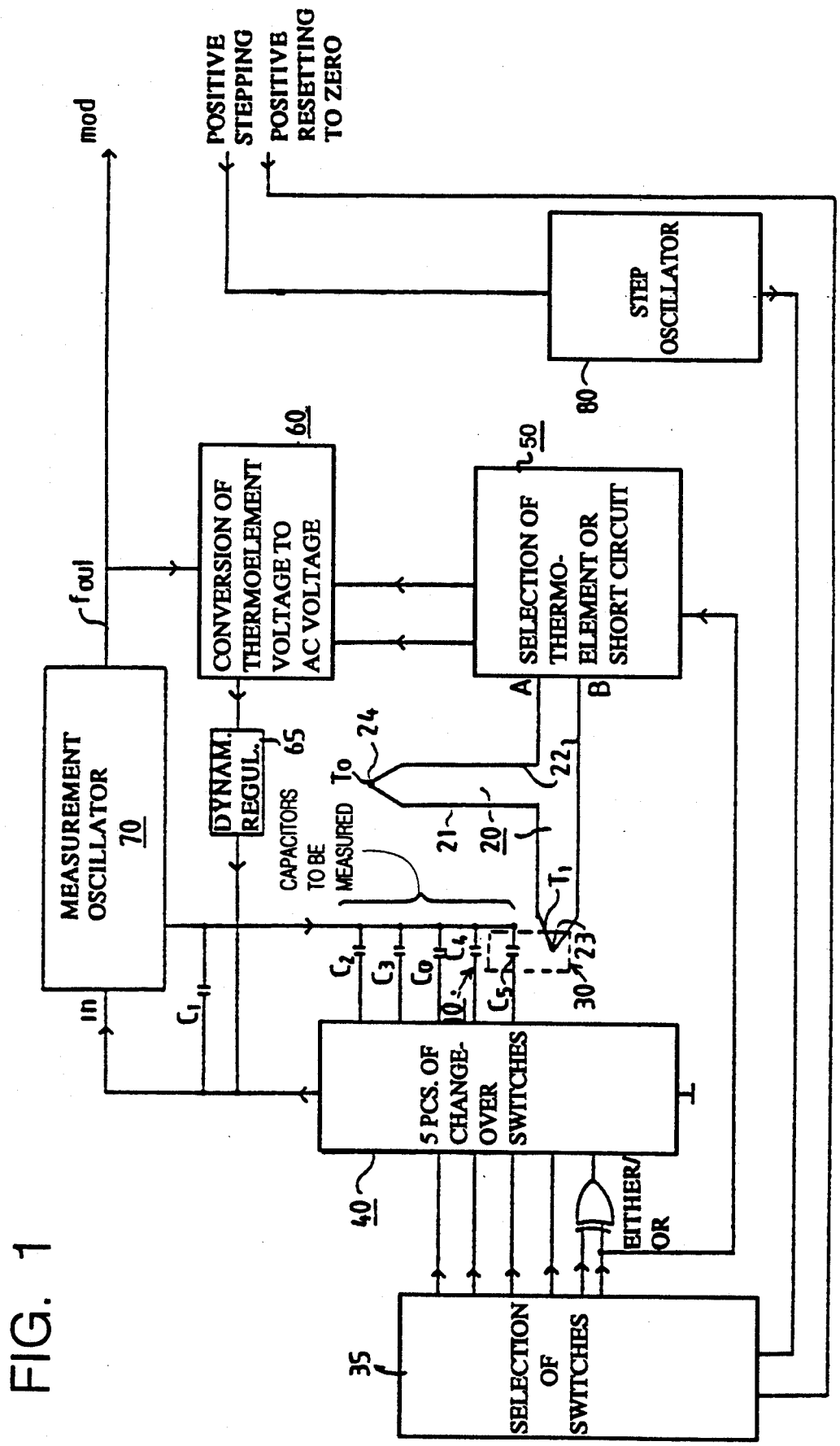
FIG. 1 is a block diagram illustration of the method in accordance with the invention and of a detector arrangement applied in same.

FIG. 1 is a schematic illustration, partly as a block diagram, of a wiring which makes use of the method and the detector arrangement of the invention and which is employed in the telemetry of radiosondes, by whose means the pressure (P), the temperature (T) and the relative humidity (U) in the atmosphere surrounding the sonde are measured. As is shown in FIG. 1, in the wiring, the capacitive detectors $C_3, C_4$ and $C_5$ are used as measurement detectors. $C_2$ is a reference capacitor, and so is the capacitor $C_0$ connected to the switch 43. These capacitors are alternatingly connected to the input of the measurement oscillator 70, to which the base capacitance $C_1$ is connected. From the measurement oscillator 70, the frequency $F_{out}$ is obtained as the output signal.

The measurement arrangement shown in FIG. 1 includes a change-over switch 40 connected to the input side of the measurement oscillator 70, said switch 40 connecting each of the capacitances $C_2, C_3, C_4$ and $C_5$ to be measured alternatingly to the input of the measurement oscillator. In respect of the details and the more detailed embodiment of this wiring, reference is made to the applicant's FI Patent 57,319 and U.S. Pat. No. 4,775,830.

The change-over switches 40 of the capacitances to be measured are controlled by means of a switch control unit 35, which receives the control signal from a step oscillator 80.

Figure 2:
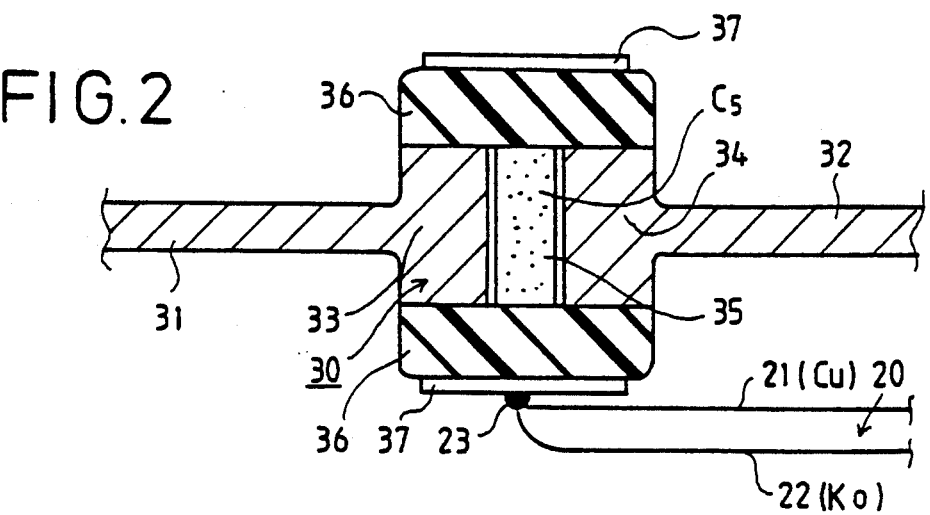
FIG. 2 is a central sectional view of a capacitive temperature detector in connection with which one branch of a thermocouple is fitted.

FIG. 2 shows a temperature detector 30, whose operation is based on measurement of the capacitance $C_5$. The detector 30 is a ceramic capacitor in which the dielectric constant of the insulation material has a relatively high dependence on temperature. The capacitance $C_5$ to be measured is formed between the electrode plates 33 and 34. From the electrode plates 33 and 34, conductors 31 and 32 depart, which are connected in the way coming out from FIGS. 1 and 5. The detector 30 is protected by means of a glass mantle 36 against effects of moisture. Onto the outer face of the glass mantle 36, a copper layer 37 has been applied, to which the joint 23 between the wires 21 and 22 of the thermocouple 20 has been soldered. From the copper layer 37, it is preferable to arrange a connection to the ground through a relatively large capacitor, e.g. a capacitor of about 10 nF. In this way, passage of the AC voltage, used for measurement of the capacitor $C_5$, to the thermocouple capacitively through the glass mantle is prevented. Further, the grounding capacitor prevents formation of stray capacitance in parallel with $C_5$ along the glass. The wire in one branch 21 of the thermocouple is, e.g., of copper (Cu), and the wire in the other branch 22 is of Constantan (Ko). Metallizing of the shield mantle of the detector 30 also prevents interfering effects of surface leakage currents on the temperature measurement.

Figure 3:
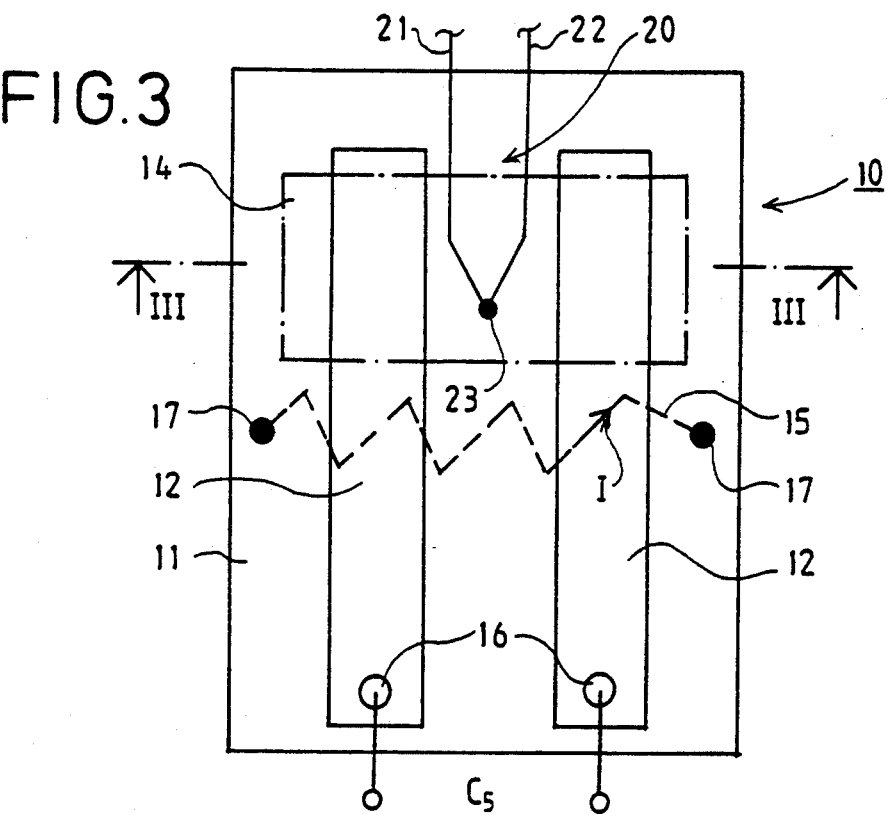
FIG. 3 is a top view of a capacitive humidity detector which can be applied in the invention.
Figure 4:
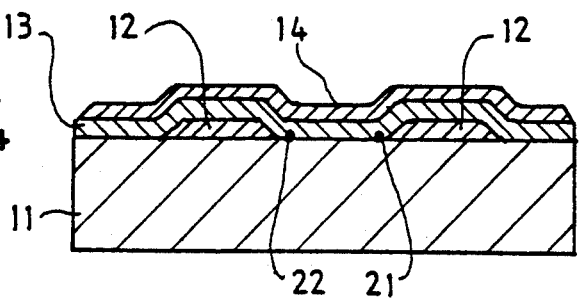
FIG. 4 is a sectional view taken along the line III—III in FIG. 3.

In the invention, it is also possible to employ a capacitive humidity detector 10, which is arranged to be heated in accordance with the principles that are described in more detail in the applicant's FI Patent 58,402 and in FIGS. 3 and 4 in the accompanying drawing.

The basic construction of the exemplifying embodiment of a capacitive humidity detector 10 illustrated in FIGS. 3 and 4 is known from the applicant's FI Patent 48,229. The base of the detector 10 consists of a support base 11 passive in respect of absorption of water, such as a glass plate. Onto the support base 11, base contacts 12 have been made, to which the wires have been attached by means of contacts 16, the capacitance $C_5$ being measured from said wires. In the detector 10, the active material is a thin polymer film 13, onto which a thin surface contact 14 penetrable by water vapour has been formed, which contact 14 is not in galvanic contact with any of the base contacts 12. In this way, the capacitance $C_4$ to be measured is formed out of the connection in series of the capacitances formed between the base contacts 12 and the surface contact 14. When molecules of water are absorbed into the film 13 material sensitive to moisture, binding of water takes place based on two different phenomena. One form of binding takes place on the molecular level and provides a quick and usually linear response in the form of a change in the capacitance $C_4$.

As the heating current of the humidity detector 10 shown in FIGS. 3 and 4, it is possible to employ the measurement current, of suitable frequency, of the detector 10, or a heating resistor 15 may be integrated in the detector 10, the heating current I being supplied to the contacts 17 of said resistor in the way illustrated in FIG. 3. When the measurement current is used as the heating current for the detector 10, the procedure followed may be in accordance with the principles described in the applicant's said FI Patent 58,402.

As is shown in FIGS. 3 and 4, a temperature measurement detector composed of a thermocouple 20 is integrated in the detector 10 in accordance with the same principle as in the detector 30 shown in FIG. 2. In the way in itself known, the thermocouple 20 has thermoelement branches 21 and 22 made of two different metals and connected with the detector 10 by means of the joint 23. One branch of the thermocouple 20 can be placed so that it measures the temperature $T_o$ in the atmosphere SA surrounding the sonde.

In practice, the detector constructions shown in FIGS. 2,3 and 4, which have been shown as illustrations of principle only, must also include a detector of absolute temperature. This integrated construction is shown by FIG. 6, in which the heating of the detector is also included, because otherwise the absolute temperature cannot be known.

A detector construction 30 in accordance with FIG. 2 has been brought into contact with a relatively thick small copper plate 41, to which a humidity detector 42,10 has also been attached, e.g. by gluing. A heating resistor 48 is connected to the copper plate 41. It is also preferable to connect a standard capacitor $C_2$ and a pressure detector $C_3$ to the plate 41, because those two may have a dependence on the temperature, even though attempts are made to make $C_2$ as insensitive to temperature variations as possible. The same also applies to the capacitor $C_3$. As is shown in FIG. 6, the mantle of the capacitor 44 ($C_5$) is attached to the plate 41 by means of a solder joint 43. A solder joint 51 fixes the mantle of the standard capacitor 47 ($C_2$) to the plate 41. The wires of the humidity detector 42 pass through holes provided in the plate 41 to the circuit card 46, to which the wires of the other components provided on the plate 41 are also passed. This circuit card 46 is preferably made of a thin flexible material, in which case its extension can be employed to combine said unit with the rest of the electronic system.

Figure 6:
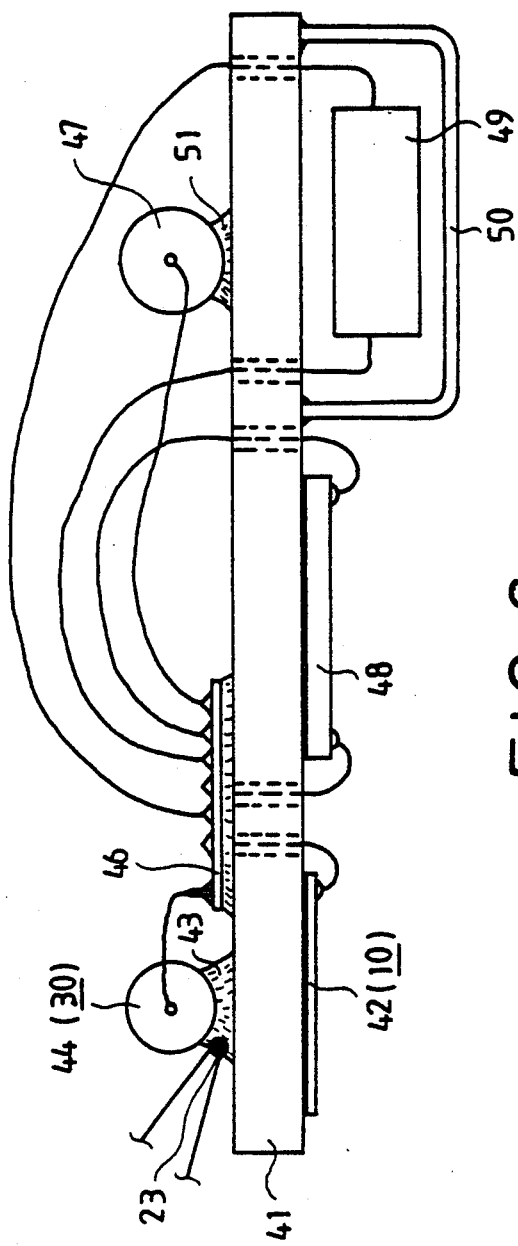
FIG. 6 is a schematic side view illustrating the locations of different detectors on the same heated copper plate.

In connection with the plate 41 shown in FIG. 6, there is a heating resistor 48, which is preferably placed so that the distance to all of the detectors and standard capacitors is substantially equally long. In this way it is possible to reduce the differences in temperature between the various detectors. Out of the same reason, it is preferable to keep the heating capacity of the resistor 48 so low that the unit is not heated more than, as a rule, about 2° ... 5° C. above the temperature of the environment. In connection with the plate 41, there is a pressure detector 49 of small size, which should not be fixed by its face to the copper plate 41 because of different coefficients of thermal expansion. Therefore, the pressure detector 49 is supported on its wires only. In order that the pressure detector 49 should, nevertheless, be at the temperature of the plate 41, it is placed in a copper cup 50, which is fixed to the plate 41 by soldering. In FIG. 6, one joint 23 of the thermocouple 20 is seen, and the other joint 24 is placed to measure the temperature $T_o$ of the atmosphere SA surrounding the sonde.

In accordance with the main principle of the invention, which comes out from FIG. 1, there is a DC voltage $U_o$ between the terminals A of the thermocouple 20, which voltage is passed through the switching unit 90 to the inverter unit 60, which converts the DC voltage $U_o$ of the thermocouple 20 to an AC voltage U(t). The output of the unit 60 is connected through the dynamism regulation unit 65 to the input of the measurement oscillator 70 as is shown in FIG. 1.

Figure 5:
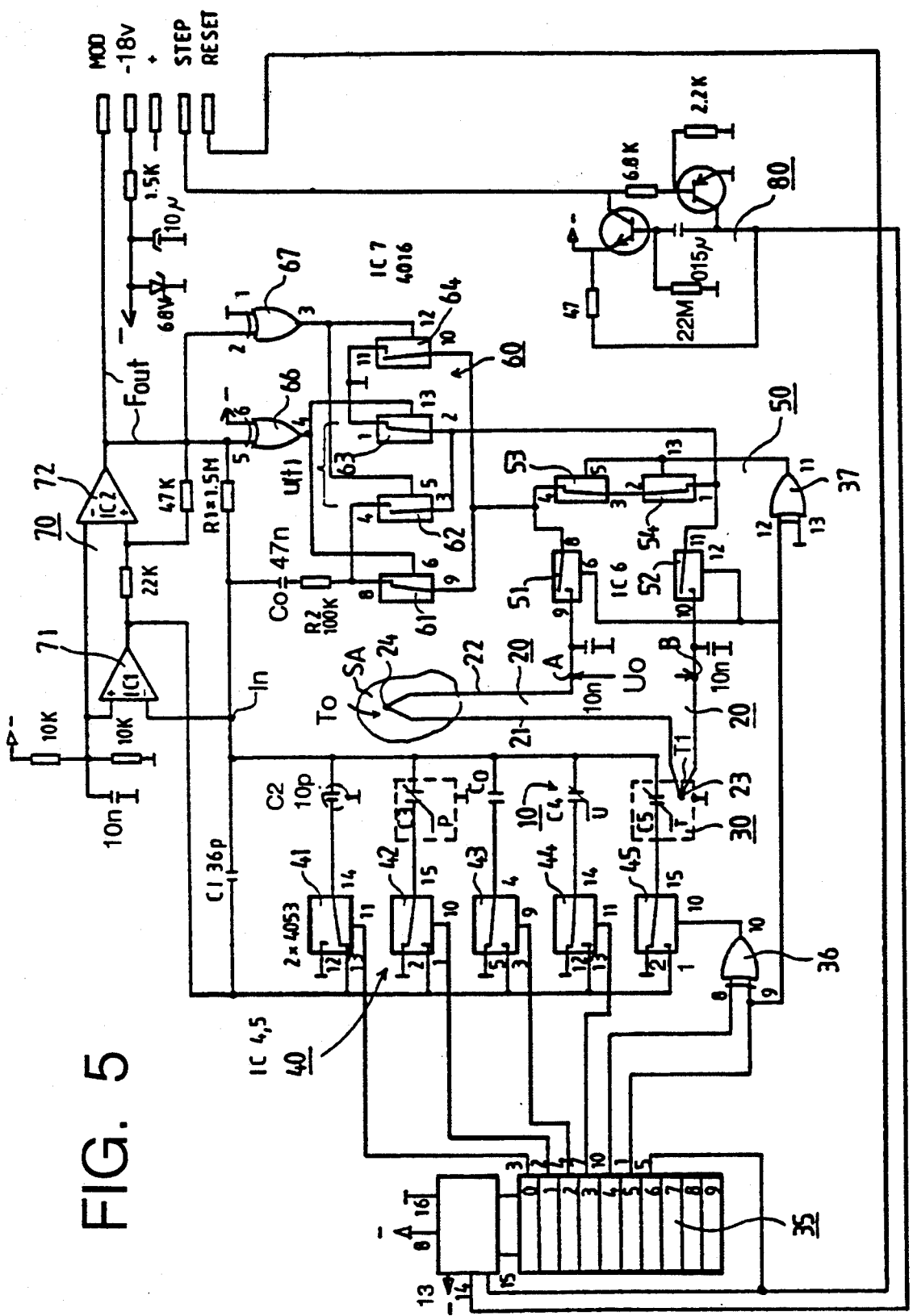
FIG. 5 is a more detailed illustration of the measurement coupling of a radiosonde that makes use of the method and the detector arrangement of the invention.

In order to establish the more detailed principle of operation of the invention, the FIGS. 1 and 5 will be examined. The switches 61,62,63 and 64 in the unit 60 constitute the inverter. This inverter 60 is switched at the rate of the output frequency $f_{out}$ of the measurement oscillator 70. The AC voltage obtained is passed through a resistor of 4.7K and through a capacitor of 100 n to the input of the measurement oscillator 70, to the same point In to which the capacitances $C_2 \ldots C_5$ to be measured are also passed alternatingly through the switches 41 ... 45.

In FIG. 5, the dynamism regulation unit 65 shown in FIG. 1 corresponds to the resistor $R_2$ and to the capacitor $C_o$. The resistor $R_2$ converts the voltage provided by the thermocouple 20 into a current which has been passed through the separator capacitor $C_o$ to the input of the measurement oscillator 70, to which the currents of the capacitors $C_2 \ldots C_5$ to be measured are also passed. In respect of further details of the functions of the measurement oscillator 70 and of the switch units 35 and 40, reference is made to the applicant's FI Patents 54,664 and 57,319. In FIGS. 1 and 5, the capacitor $C_1$ is a base capacitor, with which the capacitors $C_2 \ldots C_5$ to be measured are connected in parallel. The first reference is the capacitor $C_2$, and the second reference is the open end of the switch 43 wire, i.e. a capacitor whose capacitance is zero. In this way, an inexpensive and definitely stable reference has been obtained.

The input of the inverter 60 is short-circuited by means of the change-over switches 53 and 54. When the five capacitors $C_2,C_3,C_4,C_5$ and the "zero" capacitor in the wiring system are measured, the input of the inverter 60 is short-circuited by means of the change-over switches 53 and 54. The measurement sequence further includes one measurement. This takes place so that the switch 45 is allowed to keep the temperature measurement capacitor $C_5$ under measurement during one further switching cycle. At the same time, the switches 53 and 54 remove the short circuit from the input of the inverter 60 and the switches 51 and 52 connect the thermocouple 20 to the inverter 60. The voltage U(t) inverted from the DC voltage $U_0$ of the thermocouple 20 attempts either to increase or to reduce the frequency $f_{out}$ of the measurement oscillator 70 depending on the polarity of the thermocouple 20. One joint 23 of the thermocouple 20 is in thermal contact with the detector 30, whereas the joint 24 of the other branch is in the environment SA, whose temperature is $T_0$. Thus, by means of the thermocouple 20, the temperature difference $T_1 - T_0$ can be measured with very high accuracy.

The step oscillator 80 seen in FIGS. 1 and 5 gives needle pulses, e.g., at intervals of about 200 ms. This oscillator 80 can be controlled positively, e.g., during calibration. The switch selection unit 35 has a resetting to zero of its own. The pin 5 of the circuit 35 is connected to a reset, which can also be controlled positively. The pins 1 and 10 in the circuit IC3 of the unit 35 have an either/or gate 36, which has the effect that the lowest change-over switch 45 remains in the measurement position during two measurement cycles (2×200 ms). For the time of the latter measurement cycle, the short circuit formed by the two switches 53 and 54 in the unit 50 (IC6) is removed, and the other two switches 51 and 52 switch on the thermoelement 20 for measurement. If there is no thermocouple voltage $U_o$ between the points a and b, the situation is the same as at short circuit and, thus, both of the measurement cycles have the same frequency at the output of the measurement oscillator 70 ($F_{out}$). The either/or gates 37,66 and 67 are inverting the phase or they act as buffers and make the rising and sinking edges of the pulses sharper.

The capacitance $C_5$ of the detector 30 can be calibrated at the same time as the thermocouple 20 is calibrated. In such a case, the advantage can be obtained that, when thin thermocouple wires 21 and 22 are used, the calibration of the temperature detector $C_5$ proper can be made quicker, because the thermocouple gives quickly a message as to whether there is a difference in temperature between the reference environment SA and the detector 30. Likewise, the thermocouple 20 gives a roughly correct picture of the magnitude of this difference in temperature, and this information can be utilized when the detector 30 is calibrated. During calibration, the free branch of the thermocouple 20 should preferably be at a different temperature as compared with the capacitor $C_5$ and the branch connected to it.

The current derived from the voltage $U_o$ of the thermocouple 20 by means of the unit 90,60,65 ($R_2,C_0$) is connected to act upon the input of the measurement oscillator, whereby the frequency $f_{out1}$ is obtained, and from the difference in frequency $f_{out} - f_{out1}$ it is possible to determine, by means of calculation, both the difference in temperature $T_1 - T_0$ and the temperature measured by the detector 30. It is also possible to proceed so that in the first measurement sequence the detectors $C_2, C_5$ are again measured without the effect of the voltage U(t) produced by the thermocouple, and in the next measurement sequence all the capacitors $C_2 \ldots C_5$ are again measured so that, in the measurement of $C_5$, the effect of the voltage U(t) of the voltage produced by the thermocouple 20 is included. In accordance with the above, from the same detector $C_5$, two different frequencies are obtained, on whose basis it is possible to determine both the differences in temperature $T_1 - T_0$ and the absolute temperature detected on the basis of the capacitance $C_5$ with sufficiently high precision.

The difference in temperature $T_1 - T_o$ is represented by the difference in frequency between the frequencies $f_{out}$ and $f_{out1}$ measured twice by means of the detector 30. This difference in frequency is not utilized in a radiosonde. It is only the computer placed on the ground in connection with a radio receiver, which also possesses the calibration data, that calculates the correct meteorological values from the received six modulation frequencies. These frequencies can already be processed in the sonde, even up to the final data, but the mode of processing is, nevertheless, the same in respect of its main principle.

By means of the invention, a novel method of measurement is accomplished, by whose means a better result is obtained than by means of the prior-art arrangements. The free branch of the thermoelement 20 measures the temperature $T_0$ in the surrounding atmosphere quickly and free from radiation error. The other branch of the thermoelement 20 "rests" in the reference capacitor $C_5$, at whose temperature preferably all the other capacitors to be measured also "rest".

The better the calibration situation corresponds to the sonding situation, the lower is the significance of the temperature dependence of the invariables, because the errors arising from temperature dependence are compensated for automatically without any calculation. The errors are transferred to the temperature dependencies in addition to their own dependencies. This is why it is preferable that the standard capacitors are also at the proximity of the outside temperature.

Any other capacitor whatsoever, besides $C_5$, is also suitable for a capacitor to be measured twice, even a capacitor of 0 pF. The message from the thermocouple 20 is contained in the difference between the output frequencies $f_{out}$ that is obtained when the frequency of one measurement is subtracted from the frequency of the other measurement.

In the following, the patent claims will be given, and the various details of the invention may show variation within the scope of the inventive idea defined in said claims and differ from the details stated above for the sake of example only.

I claim:

1. A method for improving the precision of impedance detectors in radiosondes producing an output signal ($f_{out}$) corresponding to a meteorological quantity being measured, comprising the steps of:

measuring the temperature of at least one such detector by placing a first joint (23) of a thermocouple (20) to measure a temperature ($T_1$) prevailing at the detector and placing another joint (24) of the thermocouple to measure a temperature ($T_0$) in the atmosphere surrounding the detector;

obtaining from the thermocouple a signal corresponding to the difference ($T_1 - T_0$) between the measured temperature prevailing at the detector and the measured temperature in the surrounding atmosphere; and modifying the output signal ($f_{out}$) of the radiosonde by means of a signal (U(t)) representing the temperature-difference signal, so that the output signal more precisely corresponds to the meteorological quantity being measured.

2. Method as claimed in claim 1, characterized in that the signal ($U_0$) obtained from the thermocouple is a DC voltage that is converted by means of an inverter (60) or equivalent into an AC voltage (U(t)), by means of which the output signal ($f_{out}$) of the measurement coupling is affected.

3. Method as claimed in claim 1 or 2, characterized in that the method is used in connection with a capacitive temperature detector (30).

4. Method as claimed in claim 1 or 2, characterized in that the method is used in connection with a capacitive humidity detector (10).

5. Method as claimed in claim 4, characterized in that the capacitive humidity detector (10) is heated by means of one selected from the group consisting of dielectric losses of the capacitance and a heating resistor (15), fitted in connection with the detector.

6. Method as claimed in claim 2 in radiosondes whose measurement arrangements comprise capacitive detectors ($C_3 \ldots C_5$), by means of which at least one of the pressure (P), the relative humidity (U), and the temperature (T) in the surrounding atmosphere is measured, and which further comprises a measurement oscillator (70) to whose input the capacitive detectors ($C_3 \ldots C_5$) as well as a reference capacitor or capacitors ($C_1$, $C_2$) are connected alternatingly by means of a change-over switch (40), characterized in that a joint (23) of one branch in a thermocouple is fitted in connection with a capacitive detector (30) to measure temperature or with a capacitive detector (10) to measure humidity of the measurement arrangement, that a joint (24) of the other branch in the thermocouple is placed in connection with the surrounding atmosphere (SA), that the DC voltage ($U_o$) obtained from said thermocouple (20) is passed to a switching unit (50), from which unit said voltage is passed in a suitable sequence to the inverter unit (60) for the thermoelement voltage, and that the output voltage U(t) of the latter unit (60), which has been converted to a current, is passed to act upon an input of a measurement oscillator (70), to which the capacitances ($C_3 \ldots C_5$) to be measured are connected alternatingly.

7. Method as claimed in claim 1, characterized in that the method is used in connection with a capacitive detector (30) that is fixed to a relatively thick plate (41) of high thermal conductivity to which a humidity detector (10) is also fixed, and that a heating resistor (48) is connected to said plate (41).

8. Method as claimed in claim 7, characterized in that at least one of a reference capacitor ($C_2$) or capacitors ($C_2$, $C_0$) and a pressure detector ($C_3$) of the measurement arrangement is connected to said plate (41) so as to reduce the effects of the dependence on temperature of the reference capacitors.

9. Method as claimed in claim 7, characterized in that said heating resistor (48) is placed in connection with said plate (41) so that, in view of reducing the differences in temperature between at least one detector, the distance to the detectors and reference capacitors is substantially equally long.

10. Method as claimed in claim 7, characterized in that, by means of said heating resistor (48), said plate (41) and at least one detector and reference capacitors placed in its connection are heated to a level about 2° ... 5° C. above the temperature of the environment.

11. An apparatus for improving the precision of impedance detectors in radiosondes producing an output signal ($f_{out}$) corresponding to a meteorological quantity being measured, comprising:

a thermocouple (20) having a first joint (23) positioned for response to the temperature ($T_1$) prevailing at one such detector and having a second joint (24) positioned for response to the temperature in the atmosphere surrounding the detector, so as to produce a difference signal corresponding to the difference ($T_1 - T_0$) between the temperature prevailing at the detector and the temperature in the surrounding atmosphere; and means responsive to the difference signal to modify the output signal ($F_{out}$) by means of a signal (U(t)) representing the temperature-difference signal, so that the output signal more precisely corresponds to the meteorological quantity being measured.

* * * * *